United States Patent [19]
Ziegert et al.

[11] Patent Number: 5,428,446
[45] Date of Patent: Jun. 27, 1995

[54] MEASUREMENT INSTRUMENT WITH INTERFEROMETER AND METHOD

[76] Inventors: John C. Ziegert, 2335 Laurel La.;
Christopher D. Mize, 106 First Ct., both of Palm Beach Gardens, Fla. 33410

[21] Appl. No.: 364,740

[22] Filed: Jul. 11, 1994

Related U.S. Application Data

[63] Continuation of Ser. No. 38,793, Mar. 29, 1993, abandoned.

[51] Int. Cl.⁶ .......................... G01B 9/02; G01B 9/06
[52] U.S. Cl. ................................. 356/358; 356/345; 356/357; 250/315.3; 250/231.11
[58] Field of Search ................ 356/345, 357, 358; 250/237 G, 315.3, 231.11

[56] References Cited

U.S. PATENT DOCUMENTS

| | | | |
|---|---|---|---|
| 3,734,623 | 5/1973 | Wolber | 356/358 |
| 4,435,905 | 3/1984 | Bryan | 33/181 R |
| 4,492,036 | 1/1985 | Deckuith et al. | 33/180 R |
| 4,824,251 | 4/1989 | Slotwinski et al. | 356/358 |
| 5,206,704 | 4/1993 | Huber et al. | 356/358 |
| 5,259,120 | 11/1993 | Chapman et al. | 33/502 |

FOREIGN PATENT DOCUMENTS 0012202 1/1989 Japan ............................. 356/358

OTHER PUBLICATIONS

Distance–Distance Method of Straightness Measurement Annual of CIRP, 1992 vol. 41, No. 81 (pp. 581–584).

*Primary Examiner*—Robert P. Limanek
*Assistant Examiner*—Alexander Oscar Williams
*Attorney, Agent, or Firm*—Norman Friedland

[57] ABSTRACT

A ball bar gage for obtaining the accuracy of numerical control machines and the like including telescoping means integrated with an interferometer and the method of measuring the distances between two locations including an initialization process that ascertains the absolute length of the distance being measured from the differential changes in length measured by the interferometer and a computer that calculates by a trilateration computation 2 or 3 dimensional coordinates by computing the measurements obtained by the ball bar gage. A laser beam or other light source are contemplated to energize the interferometer. Similar calculations are performed with the ball bar gage and computer over a number of spatial locations commensurate with determining the accuracy of the machine being evaluated.

23 Claims, 4 Drawing Sheets

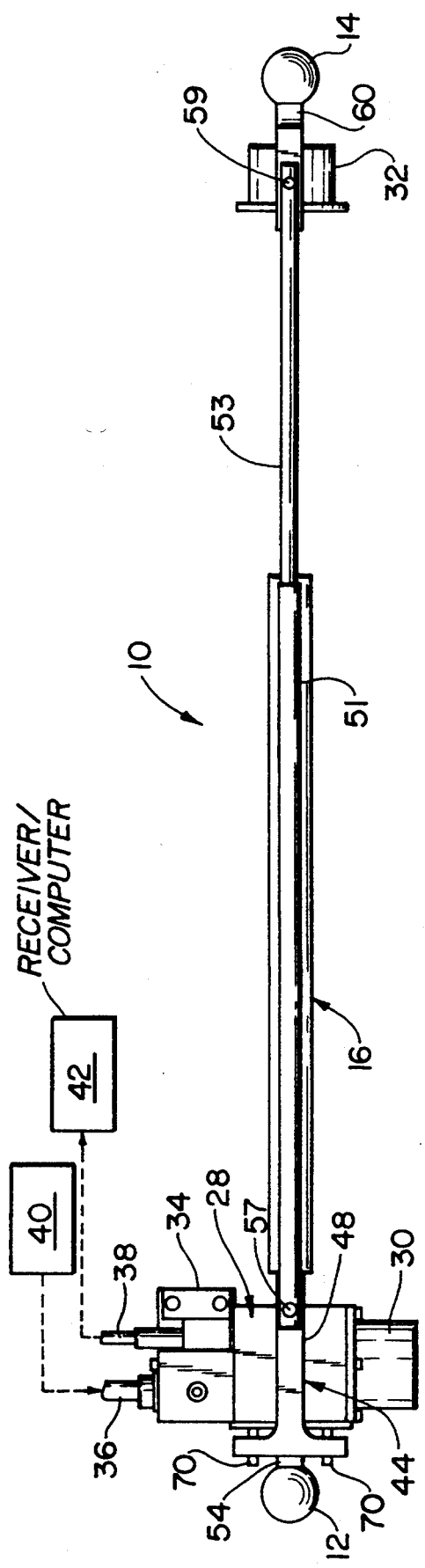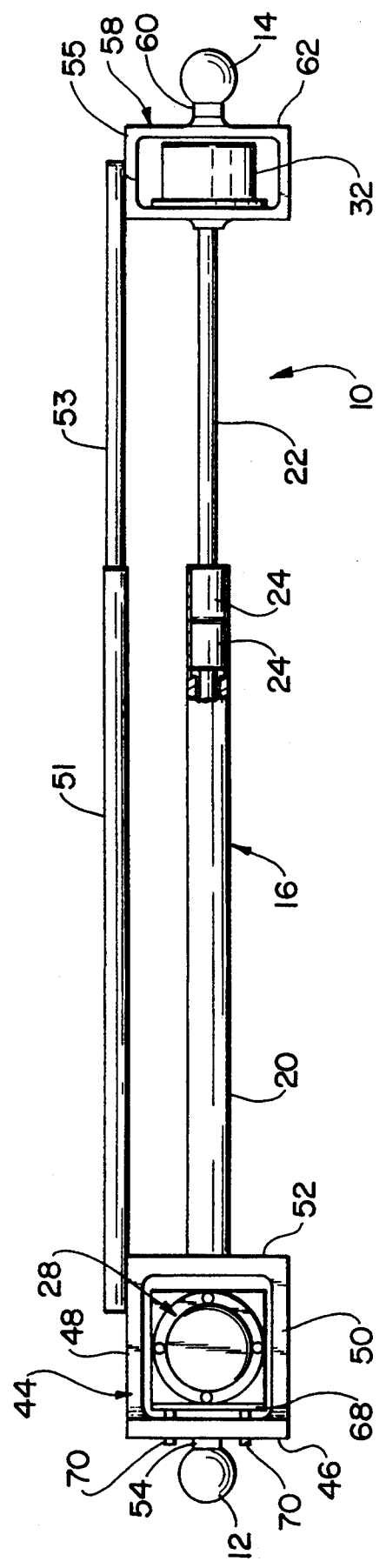

MEASUREMENT INSTRUMENT WITH INTERFEROMETER AND METHOD

This application is a continuation of Ser. No. 08/038,793, filed Mar. 29, 1993, now abandoned.

TECHNICAL FIELD

This invention relates to measurement instruments and particularly to a ball bar test gage for measuring a two or three dimensional spatial location.

BACKGROUND ART

U.S. Pat. No. 4,435,905 granted to J. B. Bryan on Mar. 12, 1984 described a telescoping magnetic ball bar test gage that serves to measure the accuracy of machine tools, robots and non-disengageable servo drives of the type that cannot be clutched out which primarily include numerically controlled machines. Essentially, this patent teaches a gage with a telescoping bar having a pair of gage balls mounted on each end and a parallel reed flexure unit and linear variable differential transformer assembly for executing a prescribed circular trajectory. Magnetic socket knuckle assemblies cooperate with the gage balls to locate the telescoping unit between a point on a remote work table and the machine being measured. While this instrument is particularly efficacious for making precise measurements of changes in the radial direction which can be used for gaging the accuracy of the machine being measured, the instrument is limited not only by the radial direction but also by the fact that it can only make measurements within the radius extending over its range of travel. However, it cannot determine the coordinates of the measured point. Of significance is that it is limited to measuring in a radial direction and lacks the capability of making two (2) and three (3) dimensional measurements.

Moreover, since the ball bar of the instrument described in the U.S. Pat. No. 4,435,905, supra, has finite displacement bounded substantially adjacent the circumference of its circular trajectory it falls within a class of apparatus that will only indicate when the machine being tested will not meet a predetermined specification. Also the metes and bounds of the specification is confined to the circular trajectory. This is in contrast with this invention that not only can determine when a machine meets the standards as prescribed above, but it will indicate whether or not the machine being tested will pass the tolerances defined in a given specification and which specification goes beyond the circular trajectory described in the prior art.

This invention constitutes an improvement over the apparatus described in the U.S. Pat. No. 4,435,905, supra, by not only extending the range of measurement to a three dimensional spatial location but also to extend the range to permit measurements that are not restricted to a circular or limited trajectory. This invention contemplates utilizing one or more telescoping fixtures each of which are integrated with an interferometer mounted between two spherical gage fittings carried at each end of the telescoping fixture. The output of the laser ball bar (LBB) gage of this invention can be used with the technique of trilateration to determine the coordinates of a point in space. It also contemplates a method of converting differential measurements produced by the interferometer into absolute lengths.

SUMMARY OF THE INVENTION

An object of this invention is to provide an improved ball bar gage.

A feature of this invention is to provide a ball bar gage that integrates an interferometer with a telescoping ball bar.

Another feature of this invention is the utilization of fiber optic cables to interconnect the interferometer with the remotely mounted laser and receiver so as to achieve unrestricted movement of the ball bar to measure points in three dimensional space over an unrestricted trajectory within the constraints of the displacement of the telescoping tube.

Another feature of this invention is to provide in another embodiment an apparatus as described that includes one or more laser ball bar combinations as described emanating from a single spherical ball for effectuating a trilateration (sequentially or simultaneously) for determining coordinates of a point in space.

Another feature of this invention is a method of initializing the laser ball bar to produce an absolute length.

Another object of this invention is the method of calculating the location of a point in space by an integrated ball bar and laser interferometer.

The foregoing and other features of the present invention will become more apparent from the following description and accompanying drawings.

BRIEF DESCRIPTION OF DRAWINGS

FIG. 1 is a top plan view partly in schematic of the laser ball bar (LBB) illustrating the laser light source and the means for receiving and computing the output signal;

FIG. 2 is a side elevation view partly in section of the laser ball bar with the interferometer integrated into the telescoping ball bar with an anti-rotation tube showing the details of this invention;

BEST MODE FOR CARRYING OUT THE INVENTION

Figure 3:
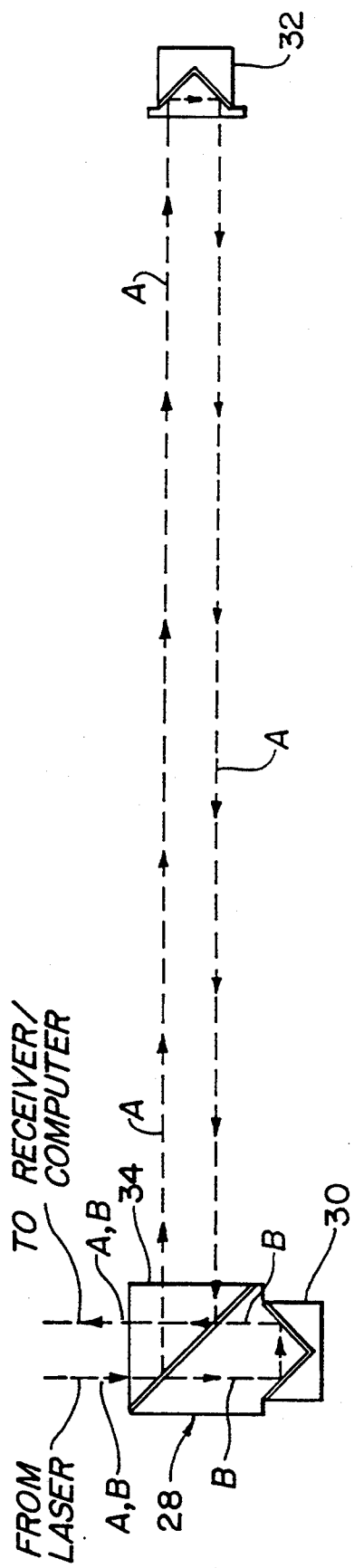
FIG. 3 is a diagrammatic view illustrating the operation of the interferometer.

While in its preferred embodiment a heterodyne interferometer is used, it is to be understood that this invention contemplates the use of any well known interferometer. For example, while the interferometer arrangement of the preferred embodiment utilizes a laser that produces double frequencies, a single frequency, non polarized beam or multiple frequencies may be employed. A suitable interferometer is commercially available from the Zygo Corporation, Laurel Brook Road, Middlefield, Conn. 06455-0448. For a better understanding of this invention reference is now made to FIGS. 1 and 2 showing the interferometer generally indicated by reference numeral 10 aligned between two spherical balls 12 and 14 supported by telescoping tube 16. The telescoping tube consists of a tubular member 20 and shaft 22 supported for rectilinear motion by two axially aligned linear recirculating ball bearings 24. While the telescoping tube is shown as having a single tube and a single shaft, as is obvious to one skilled in this art, it may comprise a plurality of both the tube and shaft depending on the particular application. It may also employ more or less than two sets of bearings. It is also contemplated that means for obtaining rectilinear motion other than the telescoping tube as described may be employed. It being understood that whatever means are employed for the intended use of this invention, precision measurement is required.

It will also be understood that while the preferred embodiment utilizes spherical balls mounted to the ends of the telescoping tube. The spherical ball(s) or socket(s) in any combination may be fixed to the end(s) of the telescoping tube. Although spherical/ball fittings are shown in all the preferred embodiment, the scope of this invention is not limited to these fittings as other fittings that are capable of providing accurate measurement through rotational movement about a fixed point are deemed to fall within the scope of this invention. Additionally, the fittings may be permanent magnets or electromagnets.

In the preferred embodiment the spherical balls are grade 5 chrome steel of the quality used for gages and the like and as will be described hereinbelow they are adapted to precisely fit into magnetic sockets for obtaining accurate center to center measurements.

The interferometer 10 consists of the polarization beam splitter (PBS) 28, fixed retroreflector 30, moveable retroreflector 32, optic pick-up 34, and the fiber optic cables 36 and 38. Fiber optic cable 36 transmits the light signal from a light source which in this instance is a suitable laser depicted by the box 40 and fiber optic cable 38 transmits the output signal to a suitable receiver and computer depicted by the box 42. Both the laser and receiver/computer are commercially available and well known devices.

A box-like structure 44 including a front vertical plate 46, a horizontal narrower top plate 48, bottom horizontal plate 50 and the vertical back plate 52 supports the encased PBS 28 and fixed retroreflector 30. Spherical ball 12 is suitably attached to front plate by a stub shaft 54. The other spherical ball 14 which is held in linear alignment with the spherical ball 12 is attached to retrosupport 58. Retrosupport 58 is a box-like structure which supports the encased moveable retroreflector 32 and includes a back plate 62 to which the spherical ball 14 is attached by stub shaft 60.

Suitable adjusting mechanism is employed to align the beam leaving the PBS 28 to the motion of shaft 22. While other adjusting mechanisms are contemplated within the scope of this invention, a kinematic adjustment mechanism is disclosed. The kinematic adjustment mechanism consists of the kinematic adjusting plate 68 attached to the encased PBS 28 and a plurality of adjustment bolts 70 threadably mounted in front plate 46 bearing against the face of the adjusting plate 68 for relative movement with respect to the PBS 28 and serves to align the beam leaving the PBS 28 to the motion of shaft 22.

The forward end of tube 20 of telescoping assembly 16 is suitably attached to the face of back plate 52 of retrosupport 44 and the aft end of shaft 22 is suitably attached to the front face of retrosupport 58. Shaft 22 and tube 16 are disposed in linear alignment with spherical balls 12 and 14.

A second telescoping tube assembly 49 51 prevents rotation of retrosupport 58. Telescoping tube assembly 49 51 comprises tube 53 attached at the front end to plate 48 and shaft 53 attached to top plate 55 of retrosupport 58. Telescoping tube assembly 49 51 which is simultaneously and concomitantly displaced with telescoping tube assembly 16 serves to prevent the retrosupport 58 from rotating relative to PBS 28. Shaft 53 and tube 51 may be secured to the respective plates 48 and 55 by screw 57 and 59, respectively or any other suitable, attaching means such as pins, rivets, and the like.

In operation, as best seen from FIG. 3, the light beam emitted from laser 40 is carried to the PBS 28 by fiber optic cable 36 which is a polarization preserving fiber optic cable. The laser beam is comprised of two plane and orthogonally polarized beams identified as lines A and B which are separated by PBS 28. PBS 28 reflects the vertical component beam A to movable retroreflector 32 and the horizontal component Beam B, which passes through PBS 28, to the fixed retroreflector 30. Beam B is relayed to the optic pick-up 34 by the fixed retroreflector 30 and beam A is relayed to the optic pick-up 34 by the moveable retroreflector 32 where both beams are combined and transmitted to the receiver/computer 42.

As is apparent from the foregoing, the interferometer, which has been previously initialized, will ascertain any displacement of the telescoping tube 16. As the LBB moves relative to the initialization point, the interferometer will register a signal indicative of the change in length of the spherical ball 12 with respect to spherical ball 14. The computer (which may be a standard digital computer), in turn, performs the requisite computations to ascertain the precise changes in distance between the centers of the spherical balls 12 and 14.

Figure 4:
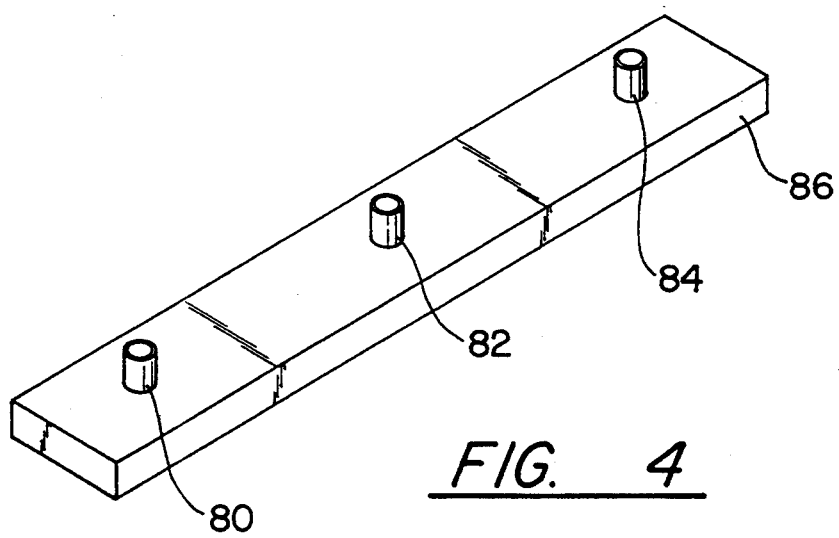
FIG. 4 is a perspective view of the initialization device for determining the absolute distance between fitting centers obtained from the interferometer signals.

However, as noted above, the interferometer can only measure changes in length since it is only a relative displacement device. In order to determine the coordinates of a point to be measured by means, such as by trilateration, it is necessary to convert the displacement to absolute lengths. This is accomplished by initializing the LBB to a known length. The interferometer measures deviations form the initialized length. The initialization fixture depicted in FIG. 4 serves this purpose. As noted in FIG. 4, the fixture comprises three (3) sockets 80, 82 and 84 that are linearly mounted on a flat rectangular base 86, preferably made from material that has a low thermal coefficient of expansion to avoid large dimensional changes due to temperature changes. Sockets 80, 82 and 84 may be fabricated from magnetic or non-magnetic material.

The method of initializing the LBB is by placing the spherical balls 12 and 14 into sockets 80 and 82 and the interferometer is initialized by adjusting its output to zero (0). Immediately, to avoid any changes of length of the base 86 because of temperature changes, the spherical ball 14 is moved to magnetic socket 84, while the spherical ball 12 remains in socket 80. The length between the centers of sockets 82 and 84 is then ascertained by the interferometer and recorded. Immediately thereafter, the spherical balls 12 and 14 are placed in magnetic sockets 84 and 82 and the interferometer output is initialized to this length. This method of initialization provides absolute length to the accuracy of the interferometer system, since the length between sockets should not have time to change appreciably during the time between measurement and initialization. While this method of initialization has been employed in actual tests of the LBB made substantially as described, as will be understood by one skilled in the art, other methods of initialization, such as fixtures fabricated from material with a minimal coefficient of expansion, are within the scope of this invention. This invention also contemplates the utilization of multiple sockets, i.e. three or more and arranged linearly or in non-linear alignment.

Figure 5:
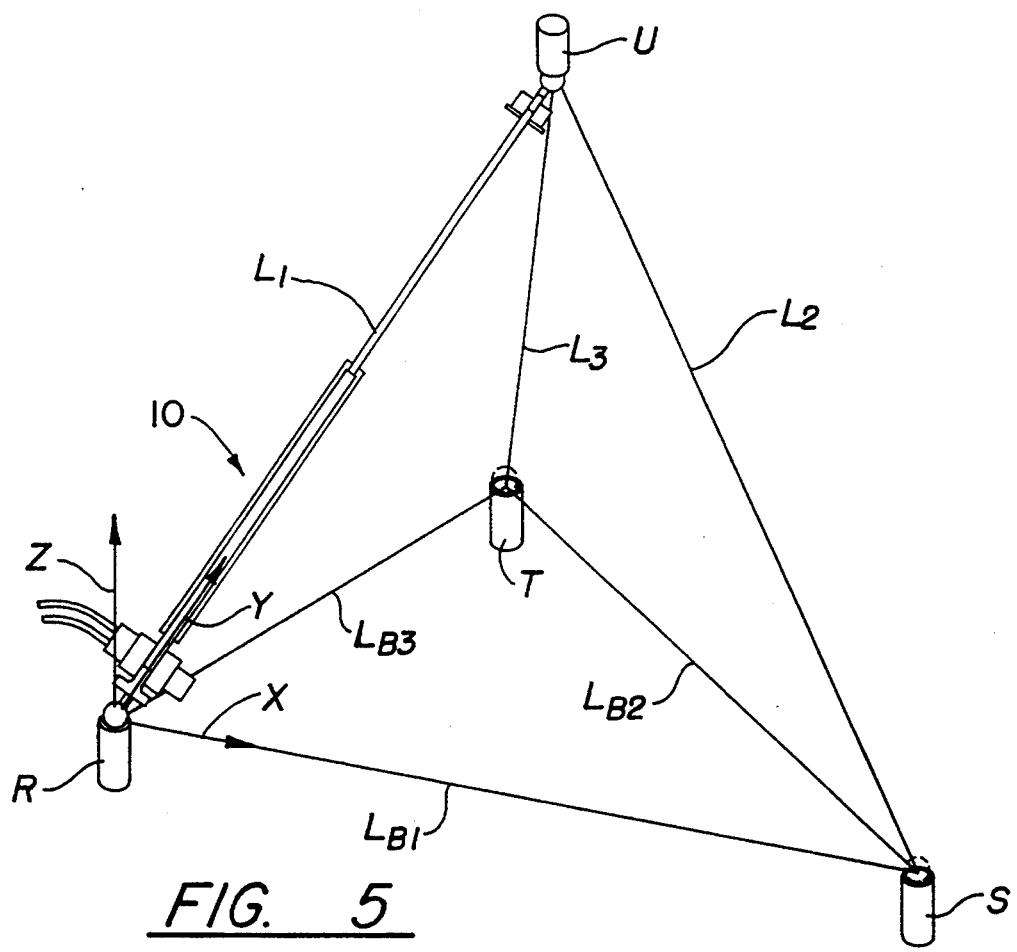
FIG. 5 is a schematic and diagrammatic view illustrating a method of use of the LBB.

Once the LBB is initialized to provide absolute lengths, it can be used to measure the accuracy of machine tools, robots and the like. For illustration purposes the technique of determining the accuracy of a milling machine is described. One magnetic socket is installed in place of the tool bit and the three others are installed at the work table. The measurement of positions in 3-D space involves using the LBB to measure the distance from the tool socket U to ends of the table sockets R, S, and T. The distance between individual table sockets R, S, and T are also measured by the LBB. The machine tool moves the tool socket U through its work space relative to the table. Absolute coordinates of the tool socket and table sockets are obtained by trilateration. FIG. 5 illustrates this technique by measuring the six (6) sides of the tetrahedron formed between the four (4) magnetic sockets R, S, T, and U. The coordinates of socket U relative to the plane formed by sockets R, S, and T can be calculated as follows:

The LBB measures the lengths of lines $L_1$, $L_2$, $L_3$, $L_{B1}$, $L_{B2}$, and $L_{B3}$. The computer then solves the following equations to ascertain the location of socket U:

$$X = \frac{L_1^2 - L_2^2 + L_{B1}^2}{2L_{B1}}$$

$$C_1 = (L_1 - X^2)^{\frac{1}{2}}$$

$$X_B = \frac{L_{B3}^2 - L_{B2}^2 + LB_1^2}{2L_{B1}}$$

$$C_B = (L_{B3}^2 - X_B^2)^{\frac{1}{2}}$$

$$D_1 = \{C_1^2 + (X_B - X)^2\}^{\frac{1}{2}}$$

$$Y = \frac{D_1^2 - L_3^2 + C_B^2}{2C_B}$$

$$Z = (C_1^2 - Y^2)^{\frac{1}{2}}$$

By these measurements and the calculations performed on these six (6) lengths of the tetrahedron, the position of the magnetic socket U or the tool bit can be determined relative to the coordinates located in the plane of the other three magnetic sockets R, S and T. Next, the tool bit of the milling machine is moved to another spatial location either manually or automatically by a program imputed to the control mechanism of the milling machine and the same measurements and calculations are performed. This process is repeated until the accuracy of the machine being tested i.e. the actual coordinates measured compared to the coordinates that the machine is programmed to produce, is determined. It is noted that the LBB can be moved in any trajectory and is not restricted to a circular trajectory and hence, is not limited in use as are the heretofore known gages. Hence, the prior art devices cannot determine spatial coordinates and are deficient because they can only ascertain radial deviations from a circular path.

Figure 7:
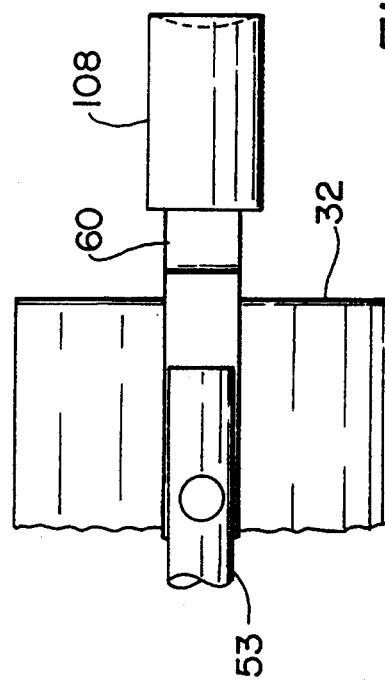
FIG. 7 is a partial view illustrating another embodiment of this invention where the fitting of the LBB is modified to accommodate a spherical ball fitting capable of supporting three LBBs.
Figure 6:
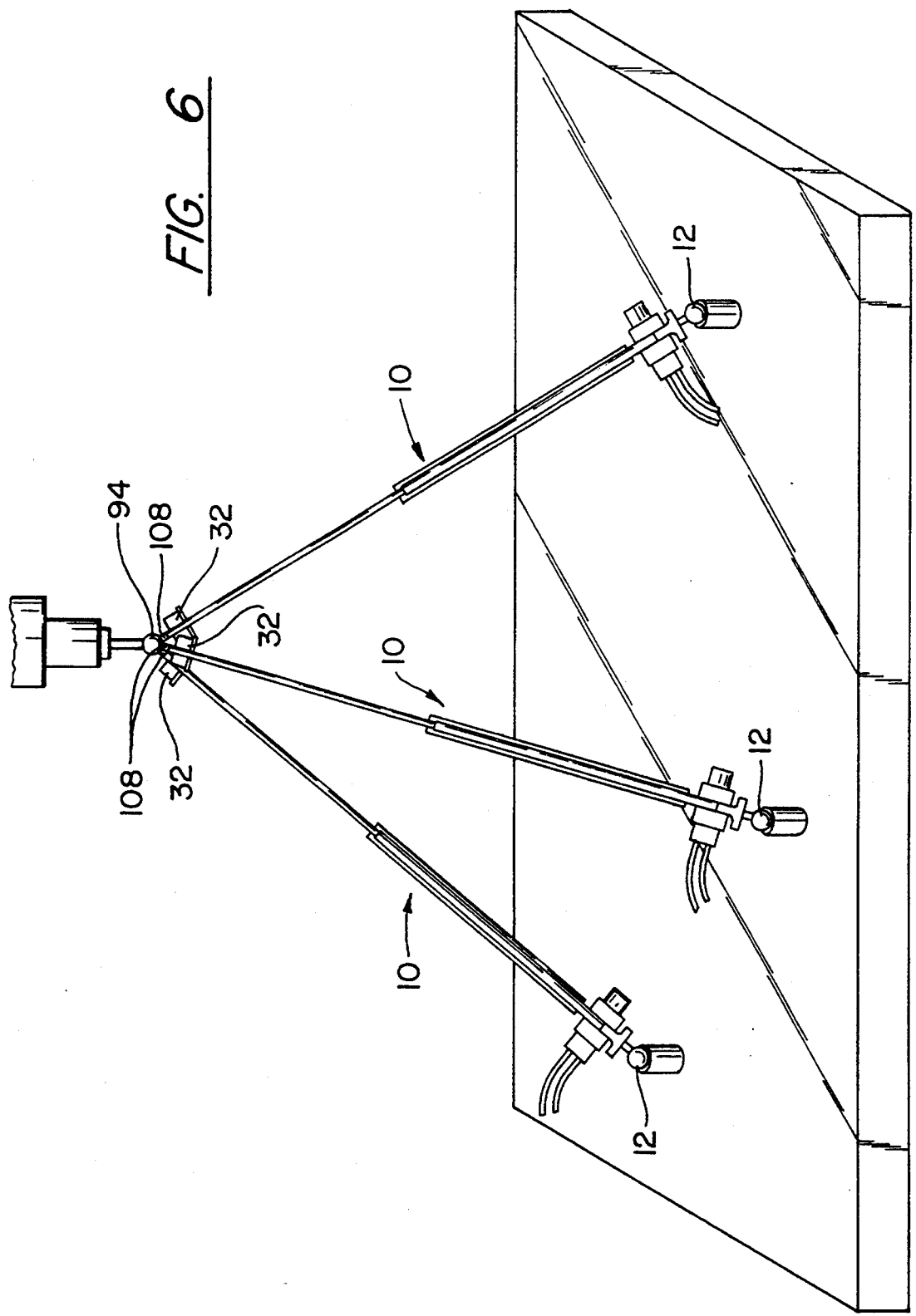
FIG. 6 is a perspective view of another embodiment embodying three LBBs emanating from a single spherical ball.

FIGS. 6 and 7 exemplify another embodiment of this invention where a modified LBB similar to the one described in FIGS. 1 and 2 is utilized. In this embodiment spherical ball 94 is configured to receive the complementary sockets 108 attached to the ends of the modified LBB. As shown in FIG. 7 which is a partial view of the end of the LBB depicted in FIGS. 1 and 2 except the spherical ball 14 (FIG. 1) is replaced by magnetic socket 108. By virtue of this embodiment the spherical ball is located in the tool bit and the three LBBs are installed to define the tetrahedron. In this method the three sides of the tetrahedron are measured instantaneously and obviously, decreasing the time necessary to inspect a machine.

Other configurations of the interferometer/telescoping tube are contemplated within the scope of this invention. For example, the PBS 28 and retroreflector 30 may be detached from the telescoping tube and a reflecting surface or mirror may be mounted at the forward portion of the telescoping tube to transmit the linear beam to the moveable retroreflector 32. It may be feasible to utilize the reflective surface of the spherical balls or sockets instead of the reflective surface. In the event laser diodes are available, they can replace the laser source and be adapted to mount directly on the telescoping tube and consequently, eliminate the input fiber optic cable. Whatever configuration is employed, according to this invention, the input beam to the telescoping tube is omni-directional such that the light source does not restrict the movement of the telescoping tube/interferometer apparatus assuring that the instrument can be utilized to measure coordinates of points moveable within infinite trajectories.

Although this invention has been shown and described with respect to detailed embodiments thereof, it will be appreciated and understood by those skilled in the art that various changes in form and detail thereof may be made without departing from the spirit and scope of the claimed invention.

We claim:

1. A measurement instrument for determining coordinates of points in three dimensional space and which may be used to determine the spatial positioning accuracy of machines, which comprises, a telescoping assembly which permits relative rectilinear extension and retraction of the two ends of the instrument, a pair of linearly opposed fittings attached to each end of said telescoping assembly, a pair of complementary fittings to be attached to suitable points on the machine being measured and which cooperate with the fittings on the ends of the telescoping assembly to permit unrestricted rotational motion about a fixed point on the bodies to which each fitting is attached, an interferometer apparatus mounted on said telescoping assembly having means for generating a signal indicative of the change in length of said telescoping assembly, a reflective means on said telescoping assembly for reflecting a beam of light from a point near one end of the telescoping assembly to a point near the opposite end of the telescoping assembly, a source of light, an omni-directional means for transmitting said light from said source to a point on said telescoping apparatus, a receiver/computer which is responsive to the output signal of said interferometer to calculate the change in length of said telescoping apparatus, an omni directional means for collecting the signal generated by said interferometer and delivering it to said receiver/computer.

2. Means to obtain the coordinates of points in three dimensional space which are distributed over an arbitrary trajectory followed by a moving body, a ball bar gage having telescoping means including fittings attached to the opposing ends of said telescoping means of said ball-bar, additional fittings attached to the moving body and the fixed body of the mechanism intended to be measured to attach to said fittings, interferometer means mounted on said telescoping means for producing a signal indicative of the change in distance between said fittings, means for initializing said interferometer so that the signal is indicative of the absolute distance between the centers of said fittings, computer means responsive to said initialized interferometer for interpreting said interferometer signal so that said computer always provides the absolute length between said opposing fittings of said ball bar as said telescoping means extends or retracts.

3. Means as claimed in claim 2 wherein said telescoping means includes a tubular member, a shaft disposed in said tubular member, and bearing means fixed in said tubular member for supporting said shaft for rectilinear motion, a laser for generating light, said interferometer including a polarization beam splitter attached near one end of said tubular member and a retroflector attached near the end of said shaft and being in linear alignment with said polarization beam splitter, a retroreflector attached to said polarization beam splitter, a first fiber optic cable for delivering said laser light source to said polarization beam splitter, an optic pick-up, a second fiber optic cable for receiving light from said optic pick-up, said polarization beam splitter for splitting light into two beams and directing one of said beams to said first retroreflector and back to said polarization beam splitter, and for directing said second beam to said second retroreflector and back to said polarization beam splitter, and for directing both returning beams to said optic pick-up where they are combined and directed into said second fiber optic cable, a receiving means for receiving said combined beams from said second fiber optic cable to measure the modulation of intensity of said combined beams to ascertain changes in the distance between said first retroreflector and said polarization beam splitter.

4. A measurement instrument for determining coordinates of points in three dimensional space as claimed in claim 1 wherein at least one of said fittings includes a spherical ball for fitting into a complementary magnetic socket assembly.

5. A measurement instrument for determining coordinates of points in three dimensional space as claimed in claim 4 wherein said opposing fitting is another spherical ball for fitting into a complementary magnetic socket assembly.

6. A measurement instrument for determining coordinates of points in three dimensional space as claimed in claim 1 wherein said source of light is a laser.

7. A measurement instrument for determining coordinates of points in three dimensional space as claimed in claim 4 wherein said interferometer is a heterodyne interferometer.

8. A measurement instrument for determining coordinates of points in three dimensional space as claimed in claim 1 wherein said signal generating means of said interferometer includes a polarization beam splitter.

9. A measurement instrument for determining coordinates of points in three dimensional space as claimed in claim 8 wherein said polarization beam splitter is mounted on said telescoping means.

10. A measurement instrument for determining coordinates of points in three dimensional space as claimed in claim 1 wherein said omni-directional means includes a fiber optic cable.

11. A measurement instrument for determining coordinates of points in three dimensional space as claimed in claim 10 wherein said reflecting means includes at least one retroreflector connected to said omni-directional means.

12. A measurement instrument for determining coordinates of points in three dimensional space as claimed in claim 1 wherein said reflective means includes a first retroreflector mounted on said telescoping means at one point and a second retroreflector mounted on said telescoping means at another point which is in moveable relationship with said first retroreflector.

13. A measurement instrument for determining coordinates of points in three dimensional space as claimed in claim 9 wherein said telescoping means includes a tubular member, a shaft disposed in said tubular member and bearing means disposed in said tubular member supporting said shaft for rectilinear movement.

14. A measurement instrument for determining coordinates of points in three dimensional space as claimed in claim 13 including means for preventing rotation of said telescoping means.

15. A measurement instrument for determining coordinates of points in three dimensional space as claimed in claim 14 including alignment means attached to said telescoping means to align the measurement light beam to the axis of motion of said shaft.

16. A measurement instrument for determining coordinates of points in three dimensional space as claimed in claim 1 wherein the omni-directional means for collecting and delivering said signal generated by said interferometer is a fiber optic cable and an optic pick-up which directs said signal into said fiber optic cable.

17. Means as claimed in claim 3 wherein said fitting means includes a magnetically attractable ball and a magnet socket assembly.

18. A method of determining the coordinates of points in three dimensional space including the steps of:

providing a ball bar gage with fittings attached to a fixed point in space and a movable point in space whose position is to be measured and an interferometer, initializing both the ball bar and interferometer to obtain an absolute length, directing the measurement beam of the interferometer used in the step of initializing via omnidirectional means from the fixed point to the movable point, using the interferometer used in the step of directing to determine the absolute distance between the fixed and movable point by measuring the change in length of the measurement beam from a predetermined absolute length to which the interferometer was initialized.

19. The method as claimed in claim 18 wherein three of said fittings in the step of providing are attached to said fixed member in a triangular pattern, thus cooperating with the fittings attached to the movable point to form the vertices of a tetrahedron, and including the steps of:

sequentially placing the previously initialized ball bar to be supported by all possible pairs of fittings and recording the absolute lengths of the six sides of the tetrahedron thus measured, calculating by a trilateration computation to determine the coordinates of the moving point.

20. The method as claimed in claim 19 wherein the movable point is the tool holder of a numerically controlled machine and the fixed points lie on the work-table of the machine, selectively moving the tool holder to various locations in the work-table of the machine which are not necessarily bounded substantially adjacent to a circular or spherical trajectory, measuring and computing at each location the actual coordinates of the tool holder, such that the three components of the positioning error of the machine at each commanded location are obtained as the difference between the coordinates of the tool holder as measured and computed by the laser ball bar system and the coordinates commanded to the machine.

21. Apparatus for initializing a ball bar gage with a mounted interferometer to obtain an absolute length, including a plate-like member having a top planar surface and multiple fittings on the top planar surface adapted to cooperate with complementary fittings attached to the ends of said ball bar gage, and said fittings on the top planar surface being arranged in a straight line.

22. A method for initializing a ball bar gage with an mounted interferometer for setting the output to obtain an absolute length thereof including the steps of:

providing a plate-like member having a top planar surface and three linearly aligned fittings, supporting the ball bar between a first and second fitting on the plate-like member and adjusting the output of the gage to read zero (0), removing one end of the ball bar from the second fitting on the apparatus and placing it into a third fitting and recording the output of the gage, removing the opposite end of the ball bar from the first fitting and placing it into the second fitting and recording the output of the gage, and adjusting the output of the gage to the previously recorded value obtained in the immediate preceding step.

23. Apparatus as claimed in claim 21 wherein said fittings are spherical ball and socket assemblies.

* * * * *

UNITED STATES PATENT AND TRADEMARK OFFICE
CERTIFICATE OF CORRECTION

PATENT NO. : 5,428,446
DATED : June 27, 1995
INVENTOR(S) : Ziegert et al

It is certified that error appears in the above-identified patent and that said Letters Patent is hereby corrected as shown below:

On column 5, line 39 change "$C_1=(L_1 - X^2)^{1/2}$" to -- $C_1=(L_1^2 - X^2)^{1/2}$ --

Signed and Sealed this

Twenty-eighth Day of September, 1999

Attest:

Attesting Officer

Q. TODD DICKINSON

Acting Commissioner of Patents and Trademarks